May 7, 1935.  L. ESPENSCHIED ET AL  2,000,130
WIDE BAND TRANSMISSION SYSTEM
Filed Dec. 16, 1932  9 Sheets-Sheet 1

INVENTORS
L. Espenschied and
E. I. Green
BY
ATTORNEY

May 7, 1935.  L. ESPENSCHIED ET AL  2,000,130

WIDE BAND TRANSMISSION SYSTEM

Filed Dec. 16, 1932    9 Sheets-Sheet 3

INVENTORS
L. Espenschied
BY E. I. Green
ATTORNEY

May 7, 1935.    L. ESPENSCHIED ET AL    2,000,130
WIDE BAND TRANSMISSION SYSTEM
Filed Dec. 16, 1932    9 Sheets-Sheet 5

INVENTORS
L. Espenschied and
BY E. I. Green
ATTORNEY

May 7, 1935. L. ESPENSCHIED ET AL 2,000,130
WIDE BAND TRANSMISSION SYSTEM
Filed Dec. 16, 1932 9 Sheets-Sheet 6

Fig. 15

INVENTORS
L. Espenschied and
BY E. I. Green
ATTORNEY

Patented May 7, 1935

2,000,130

UNITED STATES PATENT OFFICE 2,000,130

WIDE BAND TRANSMISSION SYSTEM

Lloyd Espenschied, Kew Gardens, N. Y., and Estill I. Green, East Orange, N. J., assignors to American Telephone and Telegraph Company, a corporation of New York Application December 16, 1932, Serial No. 647,682

11 Claims. (Cl. 250—9)

Modern developments in the art of communication make it highly desirable to have available transmission systems capable of handling bands of frequencies whose width may range from a few hundred kilocycles up to several megacycles. Such wide frequency bands may be utilized for the transmission of television images with good definition. If, for example, it is desired to transmit an image containing 40,000 picture elements with a total of 24 reproductions per second, there is required a frequency band of approximately 500 kilocycles in width. Still wider bands may by necessary for representing with adequate detail such scenes as a theatrical performance or an athletic event. Morever, by the application of multiplexing to wide-frequency-band transmission systems, there may be obtained substantial numbers of narrower frequency bands suitable for other uses as, for example, for telephone circuits which may require bands of about 2500 cycles in width, for high quality program circuits which may require bands extending up to 10,000 cycles or higher, for high-speed facsimile transmission, or other purposes.

This invention relates to transmission systems which will successfully handle wide bands of frequencies for such purposes. In accordance with the invention, a system having the desired wideband transmission properties is obtained by the use of radio transmission employing very high frequencies or so-called ultra-short waves. The invention is concerned especially with ultra-short-wave radio systems in which repeater stations are located at intervals sufficiently short to permit transmission between repeaters over a direct path. Repeater arrangements are described whereby two-way transmission may be effected over long distances with such a system. A feature of the invention is the provision of a multi-repeatered radio system in which multiplexing means are employed to superpose a large number of channels on a single short-wave frequency as a carrier.

A particular object of the invention is the provision of a complete two-way transmission system in which one or more wide-band radio systems may be used in association with one or more wide-band systems employing as transmission media coaxial conductor circuits, i. e., circuits comprising two conductors arranged in coaxial relation to one another. The invention includes arrangements whereby the transmission band of a coaxial system may be modulated upon an ultra-short-wave system, and the transmission band of an ultra-short-wave system translated into a coaxial system. Methods are included whereby such a system may be multiplexed to secure a maximum number of channels, and arrangements are provided for obtaining all the carrier frequencies for both the radio and the coaxial systems from a single common source. Methods of adding and dropping channels at intermediate points are likewise included.

These and other objects and features of the invention will now be more fully understood from the following description when read in connection with the accompanying drawings, in which.

The extension of the radio art into the realm of very high frequencies or ultra-short waves opens up enormously wide frequency ranges. Between 1 and 2 meters alone, for example, there is a total frequency range of 150 megacycles, which is many times the entire radio frequency range considered useful not many years ago. The frequency ranges obtainable through the use of still shorter waves are even more extensive.

Known methods of radio-frequency selection permit the use of these wide frequency ranges in the form of frequency bands which are very broad in terms of their use for communication purposes, but do not permit the sharp selection of narrow communication bands spaced at close intervals. With present technique it is possible to select in the ultra-short-wave range a frequency band which may be perhaps 1 or 2 per cent of the absolute frequency, while successive bands may be spaced at intervals corresponding to a larger percentage of the absolute frequency. Thus, with a carrier frequency of 3 meters (100 megacycles), a frequency band of about 1 megacycle in width might be obtained.

Such ultra-short waves might conceivably be used for non-repeatered transmission for considerable distances either over sea or over land. These frequencies, however, seem best adapted to transmission over fairly short distances, so that an advantageous form of system is one in which a wide frequency band modulated on an ultra-short-wave carrier is transmitted by means of radio repeater stations located at relatively close intervals.

Figure 1:
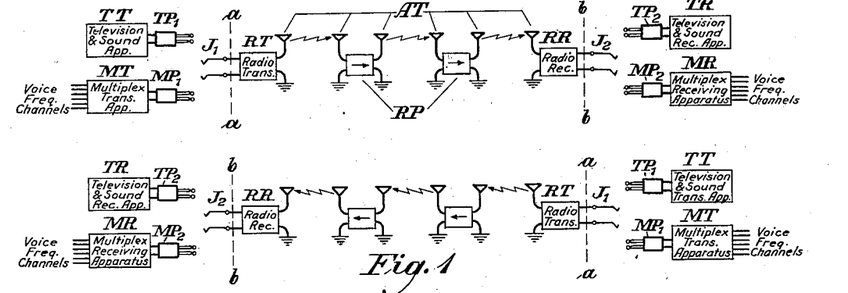
Figure 1 illustrates a multi-repeatered ultra-short-wave radio system for the two-way transmission of a wide band of frequencies which may be split up by means of multiplexing apparatus into narrower bands.

The general features of a multi-repeatered wide-band radio system of this type are shown in Fig. 1. In order to illustrate the alternative uses which may be made of the system, terminal arrangements have been indicated whereby this system may be connected to multiplex transmitting and receiving apparatus MT and MR for providing a large number of telephone channels, or to apparatus TT and TR for transmitting and receiving television signals and accompanying sound signals. For this purpose the plugs $MP_1$ and $MP_2$ or $TP_1$ and $TP_2$ would be used with the jacks $J_1$ and $J_2$.

The multiplex transmitting apparatus MT is designed to convert a number of voice-frequency bands into a series of adjacent bands located in a frequency range lying between a voice range and the final frequencies of radio transmission. This apparatus would, therefore, deliver to the radio transmitter a wide intermediate frequency band. In order that the maximum number of channels may be compressed into the available frequency space, it is desirable to employ the best available technique for the juxtaposition of carrier channels, including the use of a single sideband transmission, the provision of a high degree of filter discrimination, and the selection of the optimum frequency allocation. The television and sound transmitting apparatus TT is designed to take a band of signals corresponding to a television image and an accompanying band of sound signals and place these in adjacent positions in an intermediate frequency range.

The radio transmitter RT is designed to take the intermediate frequency band delivered by the multiplexing apparatus or the television and sound apparatus and modulate this upon an ultra-short wave for radio transmission. The wave length employed should preferably be sufficiently short to avoid reflection from the Heaviside-Kennelly layer.

The repeaters RP are designed to receive, amplify and retransmit the radio-frequency waves for each direction of transmission. The spacing between repeaters should be determined to permit direct transmission of waves between repeaters without appreciable obstruction due to the earth's curvature or other causes, the stations being located so as to take advantage as far as practicable of natural variations in the elevation of the terrain. The antennas AT at the terminals and the repeater stations should preferably be made highly directive in order to concentrate energy along the desired line of transmission.

Considering a single direction of transmission, the amplification at a repeater point might be provided with or without a shift of frequency, that is to say, the amplifier for one direction of transmission may receive and retransmit the same frequency band or may be designed to receive one frequency band and retransmit another. The latter arrangement requires additional wave-length assignments, the exact number of which would be dependent upon how soon a particular frequency band used in one repeater section may be reused in a subsequent section. While two-way transmission might be accomplished on the same wave length, it will usually be preferable to employ different wave lengths for transmission in opposite directions.

At the receiving terminal the radio receiver RR receives the incoming radio-frequency band and reconverts it to an intermediate frequency band for application either to the multiplex receiving apparatus MR or to the television and sound receiving apparatus TR. Detailed arrangements of apparatus which may be used in the system of Fig. 1 are described in connection with subsequent figures.

Figure 2:
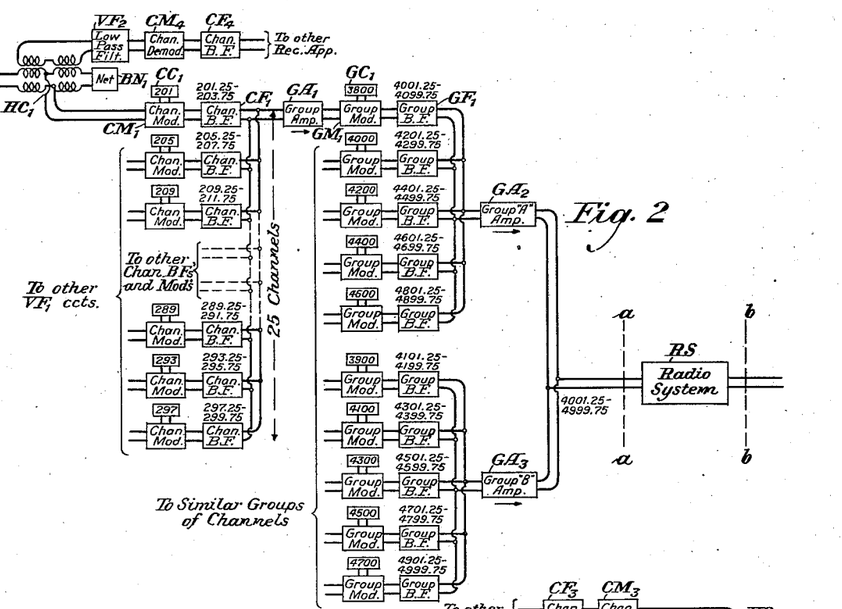
Figs. 2 and 2a represent an arrangement of multiplexing apparatus which may be used in conjunction with such a system.
Figure 2A:
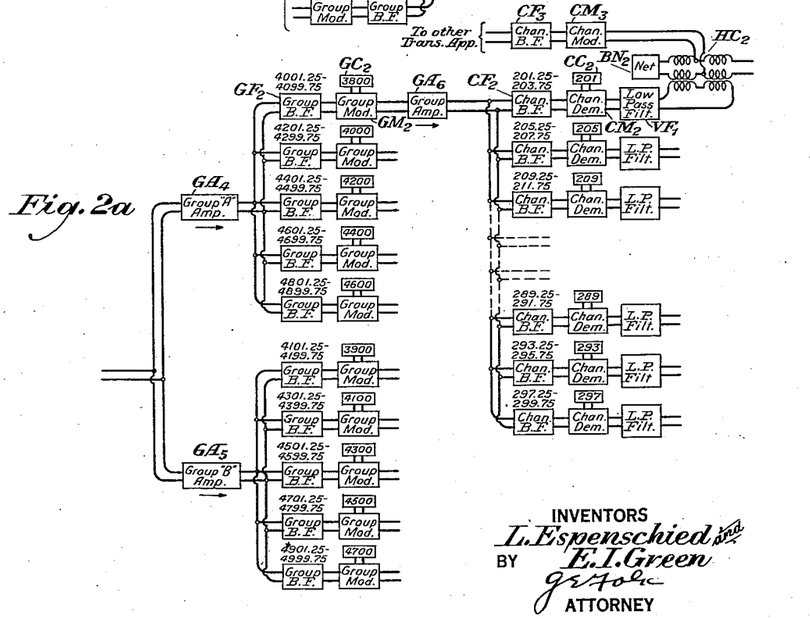

Referring now to Fig. 2 and Fig. 2a (which fits on Fig. 2) the multiplexing apparatus may be considered in detail. For the sake of concreteness let it be assumed that the radio system will pass through its various circuits, including modulating and selecting circuits, amplifiers, tuned antennas, etc., a frequency band of one megacycle, and that it is desired to deliver to the radio system, in a form suitable for conversion to the final transmission band, an intermediate frequency band containing within a total width of one megacycle as many telephone channels as practicable. An arrangement of apparatus and possible allocation of frequencies adapted to this purpose are shown in Fig. 2. It is assumed that "four-wire" operation is employed, a separate transmission path being provided for each direction of transmission.

The first step in the multiplexing process is that of modulating the voice-frequency band (which might be something like 2500 cycles in width, extending from about 250 to 2750 cycles) upon a suitable carrier frequency. To accomplish this the incoming band, after passing through the usual hybrid coil arrangement $HC_1$ with its balancing network $BN_1$, is applied to a channel modulator $CM_1$ which is supplied with a suitable carrier frequency by a source $CC_1$.

The channel modulator $CM_1$ may be of the vacuum tube type or may employ a passive element or elements having non-linear voltage-current characteristics. The carrier frequencies shown in the diagram are based on the use of channel modulators of the vacuum tube type. An element which also is well adapted for the modulating function is a thin piece of material comprising a mixture of finely divided particles of carbon and clay. Such a non-linear element may be designed to have a voltage-current curve of such shape that the output contains only terms representing odd-order powers of input. Under such conditions it is convenient to use the third order term which yields two side bands of the form $2C \pm V$, where C is the input carrier frequency and V represents the input signal frequency.

In order to reduce the load on amplifiers and modulators which handle a number of channels, it is desirable that the carrier frequencies of the different channels be substantially suppressed. This may be accomplished by the use of a balanced modulator comprising vacuum tubes in the well-known "push-pull" arrangement, or, if a modulator having only odd order terms in the output is employed, the suppression will be automatically secured.

In order to permit the most effective use of the frequency range, it is desirable that each channel be transmitted on a single sideband basis. Selection of the wanted sideband is accomplished in the channel band filter $CF_1$, which serves to suppress the unwanted sideband and other unwanted frequencies appearing in the modulator output. Heretofore the selection of a single sideband at the transmitting end and the corresponding selection between different bands at the receiving end have usually been accomplished by band filters comprising electrical reactive elements. With such a filter, efficient selection is accomplished only at comparatively low frequencies (say, 5 to 50 kilocycles) since the dead space required for obtaining sufficient cut-off in the filter characteristic is of the order of several per cent of the absolute frequency.

A much more efficient selecting means is a wave filter employing piezoelectric elements as disclosed in U. S. Patent No. 1,795,204 to L. Espenschied. With a filter of this type it has been found possible to select a telephone band 2500 cycles wide lying in the frequency range between 50 and 500 kilocycles with only a fraction of 1 per cent of the absolute frequency set aside for the cut-off.

In general, it will be impracticable to go directly from the first step of modulation to the final frequencies of radio transmission, owing partly to difficulties which are encountered in providing suitable channel band filters over a frequency band as wide as 1 megacycle, and partly to the difficulty of shifting directly from the comparatively low frequencies at which the band filters are effective to the extremely high frequencies desired in the radio system. Accordingly, the sideband delivered by the band filter is combined with other bands occupying adjacent positions in the frequency spectrum, and a second step of modulation is provided in which the channels are shifted in groups or blocks to a position suitable for modulating the radio frequency. In the present instance it is assumed that the channels are combined into groups consisting of 25 channels each. The frequency position of each group is assumed to be from 200 to 300 kilocycles, and a total of 10 groups is assumed to be provided in all.

The group of channels coming from the band filters is applied to a group amplifier $GA_1$ which partially or entirely neutralizes losses sustained in the previous processes. The amplifier output is applied to a group modulator $GM_1$ which shifts all channels to a higher position in the frequency spectrum. This modulator is supplied with a carrier frequency from the source $GC_1$, the frequencies of the various modulators being determined so as to shift the various groups to different positions in the frequency range between 4 and 5 megacycles.

The group modulator $GM_1$ is preferably of the vacuum tube type. In order to avoid the production of undesired modulation components which might fall within the range of the useful frequency bands, it is desirable that this modulator be operated with a large carrier supply and a low signal level.

In the output of the group modulator there is a group band filter $GF_1$ which passes one of the sidebands of modulation (comprising 25-channel sidebands) and suppresses the unwanted sideband, together with other unwanted frequencies. The elements of this filter may be ordinary electrical reactances. The carrier frequency supplied to the group modulator may be suppressed in part by balance in the modulator and in part by the selectivity of the group band filter.

On leaving the group band filter, the channels of the group are combined with channels of other groups and passed through a group amplifier $GA_2$. The groups in the output of this amplifier are combined with groups delivered by a parallel amplifier $GA_3$ and applied to the radio system RS. It will be noted that the groups which are combined for application to the group amplifier $GA_2$ do not occupy adjacent positions in the frequency spectrum but are separated from one another by the width of one group, while the groups delivered by the two amplifiers in parallel interleave so that the final band delivered to the radio system comprises a continuous spectrum of channels lying between approximately 4 and 5 megacycles. This arrangement of the groups may be described as an "odd and even arrangement," inasmuch as groups No. 1, 3, 5, etc., are combined and passed through the amplifier $GA_2$, while groups No. 2, 4, 6, etc., are combined and passed through the amplifier $GA_3$.

This arrangement of the groups is disclosed in an application for patent of C. L. Weis, Jr., for a Wave transmission system, Serial No. 556,949, filed August 14, 1931, Patent No. 1,910,977, dated May 23, 1933. The purpose of the arrangement is to avoid difficulties that might occur if all of the groups of filters were connected in parallel. In order to use the frequency range most effectively, the frequency interval between adjacent groups in the final frequency band must be made about the same as the interval between channels of a group. If all group filters were connected in parallel, the cut-off regions of any one filter would coincide to a considerable extent with the pass bands of the adjacent filters, which might result in undesirable reactions between filters. With the odd and even scheme this is avoided.

The elements of the radio system RS are described later. On the receiving side which is illustrated in Fig. 2a the units of apparatus and the functions which they perform are rather close counterparts of the corresponding elements and functions which have been described for the transmitting side. The entire received band is applied to two group amplifiers $GA_4$ and $GA_5$, the "odd" groups being selected in the output of one of these amplifiers and the "even" groups in the other. The selection of groups is accomplished by group band filters such as $GF_2$, and the output of each filter is applied to a group demodulator $GM_2$ which is supplied with a carrier frequency by the source $GC_2$.

The output of the group demodulator is passed through the amplifier $GA_6$ which is designed particularly to amplify the desired range of frequencies from 200 to 300 kilocycles. Leaving the amplifier, the individual channels are selected by channel band filters $CF_2$ and each channel is brought down to voice frequencies in a channel demodulator $CM_2$, which is supplied with carrier frequency by a source $CC_2$. It may be noted that the group filter $GF_2$ will, in general, pass certain frequencies of adjacent groups in addition to the wanted group. The frequencies in the demodulator output which correspond to these incompletely suppressed groups are eliminated by the channel filters, which, as previously explained, employ piezoelectric elements to secure a sharply selective characteristic. In the output of the channel demodulator the low-pass filter $VF_1$ selects the voice-frequency band and eliminates other undesired frequencies which may be present. The voice band then passes to the ordinary telephone circuit through the medium of the hybrid coil HC₂ with its balancing network BN₂. The conjugate terminals of the hybrid coil are connected to channel transmitting apparatus of which only the modulator CM₃ and the filter CF₃ are shown. Similarly, on the transmitting side the final portion of the channel receiving apparatus, comprising the filter CF₄, demodulator CM₄ and filter VF₂, is shown in connection with the hybrid coil HC₁. Thus the diagram indicates all of the essentials for a complete two-way system employing separate transmission paths for each direction of transmission. It will be understood that the frequencies assumed have been selected merely for purposes of illustration and that other frequency allocations are possible.

Figure 3:
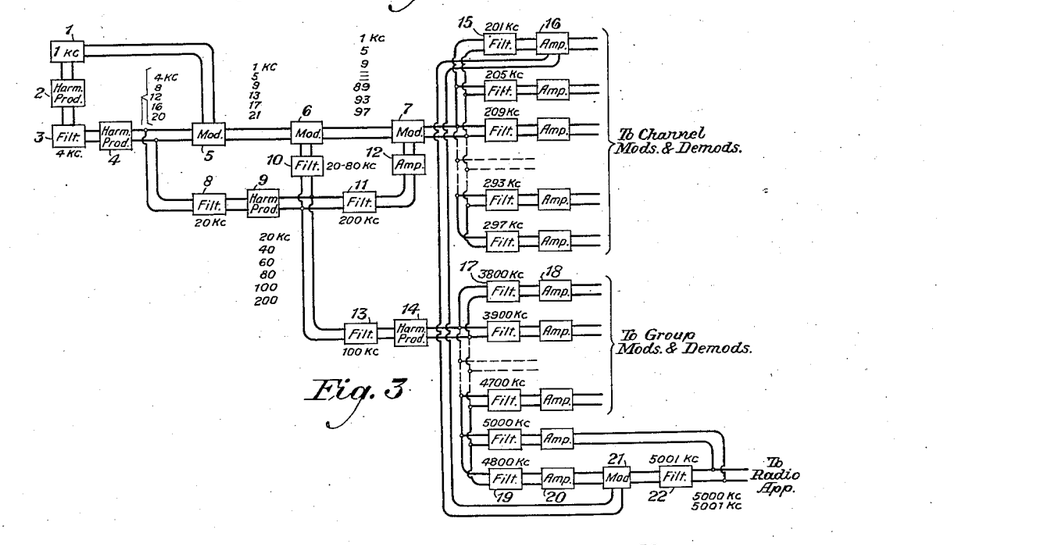
Fig. 3 indicates an arrangement for the generation of the carrier frequencies in a multiplex system.

The successful performance of the multiplex scheme illustrated in Fig. 2 will require stable and accurate sources for all of the carrier frequencies. An arrangement which may be advantageous in this connection is shown in Fig. 3. This arrangement indicates how all of the carrier frequencies required for a multiplex system such as that of Fig. 2 may be derived from a single accurate source. This accurate source of frequency, which is designated 1 in Fig. 3, is assumed to be 1000 cycles. This source would preferably be in the nature of a precision standard or sub-standard.

By means of the harmonic producer 2 and the filter 3, there is derived from the source 1 a frequency of 4 kilocycles. A second harmonic producer 4 yields frequencies of 4, 8, 12, 16 and 20 kilocycles. These frequencies are applied to the modulator 5, which is also supplied with a frequency of 1000 cycles from the source 1. In the output of the modulator 5 there are obtained, in addition to other frequencies, frequencies of 1, 5, 9, 13, 17 and 21 kilocycles. These frequencies are combined in the modulator 6 with frequencies of 20, 40, 60 and 80 kilocycles, the manner of whose derivation is explained later.

In the output of the modulator 6 there will be found frequencies ranging from 1 to 97 kilocycles in steps of 4 kilocycles. These frequencies are combined in the modulator 7 with a frequency of 200 kilocycles to obtain frequencies extending from 201 to 297 kilocycles in steps of 4 kilocycles. The carrier frequency for a particular channel is selected by a filter 15 which may consist of a piezoelectric crystal arrangement. After passing through the amplifier 16, this frequency is ready for use as the carrier supply for one or more channel modulators or demodulators.

The source of some of the frequencies used in the above process will now be pointed out. In the output of the harmonic producer 4, there is a branching circuit leading to a filter 8 which selects a frequency of 20 kilocycles. This frequency is applied to the harmonic producer 9, which yields frequencies of 20, 40, 60, 80, 100 and 200 kilocycles. The first four of these frequencies are selected by the filter 10 and used in the modulator 6, as previously described. The frequency of 200 kilocycles is selected by the filter 11 and after passing through the amplifier 12 is used in the modulator 7, as previously described. It will be understood that in any case where the losses in a previous part of the circuit have been appreciable, an amplifier may be inserted to secure the desired amount of energy. Thus it would be possible to use amplifiers similar to the amplifier 12 in various parts of the circuit where needed.

The arrangement as thus far described provides all of the frequencies necessary for the individual channels. In addition, however, accurate frequencies may be derived for the group modulators and demodulators. For this purpose the frequency of 100 kilocycles, which is one of the components appearing in the output of the harmonic producer 9, is selected by the filter 13, and used in the harmonic producer 14 to generate frequencies extending from 3800 to 4700 kilocycles in steps of 100 kilocycles together with frequencies of 4800 and 5000 kilocycles. If desired, there might be substituted for the simple harmonic production process in 14 a combination of modulation and harmonic production whereby the desired frequencies would be obtained.

The frequencies from 3800 to 4700 kilocycles serve for the supply of the group modulators and demodulators, a filter and amplifier such as 17 and 18 being used in each supply. Thus the arrangement described furnishes all the frequencies necessary for one multiplexing terminal. Evidently a similar process may be used for the other terminal. There is also, however, the question of obtaining synchronism between terminals. This might be accomplished by transmitting the 1000-cycle source over a suitable transmission path to the distant terminal. In fact, arrangements might be provided whereby an accurate source of 1000 cycles would be made generally available throughout the country. In case such a scheme should prove impracticable, however, it might be found desirable to obtain synchronism through frequencies transmitted directly over the radio system itself.

For this purpose the frequency of 1000 cycles may be transmitted as a frequency difference, the corresponding frequencies in the intermediate band being 5000 and 5001 kilocycles. The derivation of the 5000-kc. frequency has already been indicated. To obtain the 5001-kc. frequency, the frequency of 4800 kilocycles, which is selected by the filter 19 and amplified in the amplifier 20, is combined in the modulator 21 with a frequency of 201 kilocycles obtained from the channel supply furnished by the amplifier 16. The desired output frequency of 5001 kilocycles is selected by the filter 22 and the two frequencies of 5000 and 5001 kilocycles are combined with the intermediate frequency band which is delivered to the radio system. At the receiving end the intermodulation of the two frequencies of 5000 and 5001 kilocycles yields the desired accurate source of 1000 cycles, which furnishes a basis for the derivation of the channel and group frequencies in accordance with the arrangement of Fig. 3.

Referring now to the radio system, some of the features which have already been described briefly may be examined in greater detail. It seems desirable that reflection from the Heaviside-Kennelly layer be avoided by using a wave length less than about 8 meters. In the range below 8 meters, there seem to be two natural frequency divisions which might be utilized for the multi-repeatered system. These divisions are, first, the range from about 8 meters to about 1 or 2 meters, and second, that from about 1 or 2 meters to about 10 centimeters. In the former range it is possible to construct vacuum tube oscillators of the ordinary type, using three-electrode tubes with separate oscillating circuits. In the latter range, wave generation is at present accomplished by the application of special phenomena, such as the electron oscillations of the Barkhausen-Kurz and Gill-Morrell oscillators.

Figure 4:
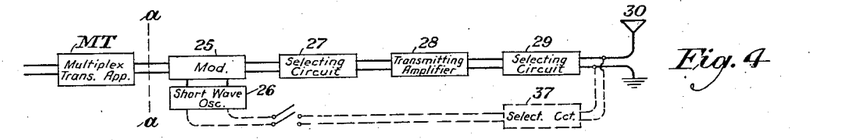
Figs. 4, 4a, 5 and 5a show arrangements of terminal apparatus for an ultra-short-wave radio system.
Figure 4A:
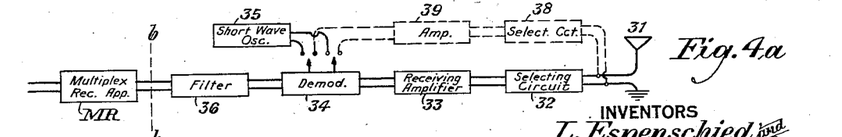

In order to cut down the load on the transmitter and the repeaters, it may be desirable that the short-wave carrier frequency be either entirely suppressed or transmitted at a comparatively low level. Single sideband transmission is desirable for greatest economy of frequencies. A diagram of a form of radio transmitter and receiver which might be used for the multi-repeatered system is given in Figs. 4 and 4a, Fig. 4 representing the transmitting side of the terminal, and Fig. 4a the receiving side. The radio-frequency processes indicated in the diagram are similar to those which would be used at lower frequencies. The circuit arrangement obtained by using the solid line connections may first be considered. The multiplex transmitting apparatus MT (which may be of the type illustrated in Fig. 2) delivers a frequency band which is shifted to its radio-frequency position in a modulator 25, supplied with carrier frequency by a short-wave oscillator 26. In the modulator output a selecting circuit 27 is provided to eliminate the unwanted sideband of modulation and other unwanted frequencies. The carrier frequency may be eliminated by a combination of modulator balance and selection. The wanted sideband is amplified in an amplifier 28 and after passing through the final selecting circuit 29 is applied to the transmitting antenna 30.

On the receiving side (Fig. 4a) the apparatus functions in a reverse manner. The incoming frequency band which is received on the antenna 31 is separated from other received frequencies by the selecting circuit or filter 32 and amplified in the amplifier 33. It is then applied to the demodulator 34, which is supplied with a suitable source of carrier frequency by the short-wave oscillator 35, this oscillator preferably having a frequency different from that of the transmitting oscillator 26. In the output of the demodulator 34 the wanted intermediate frequency band is selected by the filter 36 and is then ready for application to the multiplex receiving apparatus MR.

In some cases it may be found that a sufficient output may be obtained directly from the short-wave oscillator-modulator combination so that the transmitting amplifier and one of the selecting circuits of Fig. 4 may be omitted. Similarly, in Fig. 4a it may be found desirable to eliminate the receiving amplifier 33 and provide any needed amplification at lower frequencies.

In the above description of Figs. 4 and 4a, the sources of carrier frequency at the transmitting and receiving ends are assumed to be separate. Consequently, these sources will need to be quite stable. In case difficulty is experienced in securing suitable stability with available technique, an alternative arrangement as indicated by the dotted line connections might be employed. This arrangement contemplates the transmission of a small amount of carrier frequency through the selecting circuit 37 and thence to the antenna 30, while on the receiving side the corresponding carrier frequency may be selected by the selecting circuit 38, amplified in the amplifier 39 and used to supply the demodulator 34.

There is, however, a possible objection to the scheme just described. In order to permit the elimination of the unwanted sideband, the intermediate frequency band is preferably placed fairly high in the frequency spectrum so that the final carrier frequency would be some distance away from the transmitted sideband. Hence, while the frequency range of the sideband would be utilized efficiently, that in the vicinity of the carrier would not be occupied. A possible way of avoiding this difficulty would be to keep the intermediate frequency band in a lower range (say from 100 to 1000 kilocycles) and employ double sideband transmission for the radio system. While such an arrangement would be practicable, the inherent inefficiency of double sideband transmission indicates that some other plan might be preferable.

Figure 5:
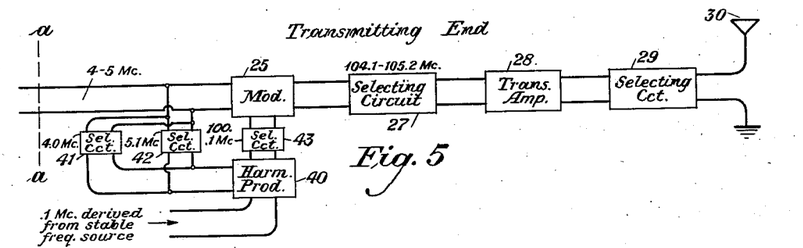
Figure 5A:
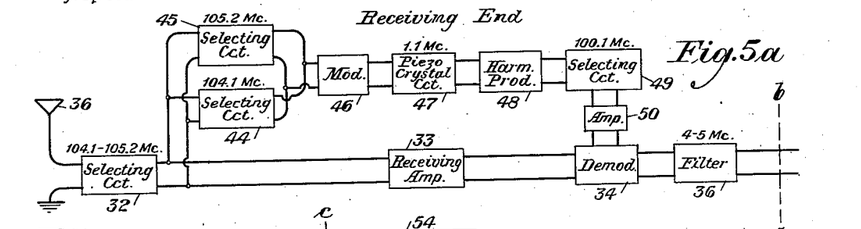

Figs. 5 and 5a illustrate such a scheme. Two auxiliary frequencies are transmitted over the radio system, one on either side of the signal band and both closely adjacent thereto. At the receiving end the difference between these two frequencies is used to generate the desired carrier frequency. Referring to the figure, a frequency of 100 kilocycles derived from a stable source of supply is applied to the harmonic producer 40. This frequency of 100 kilocycles may be derived from the carrier frequency supply system illustrated in Fig. 3. In the output of the harmonic producer 40 a frequency such as 100.1 megacycles may be selected by the selecting circuit 43 and supplied to the modulator 25, while frequencies such as 4.0 and 5.1 megacycles may be selected by the selecting circuits 41 and 42 and applied to the modulator input. The selecting circuit 27 passes the transmitted band extending from 104.1 megacycles to 105.2 megacycles and, as before, the band passes in succession through the amplifier 28 and the selecting circuit 29 to the transmitting antenna 30.

On the receiving side the incoming band of frequencies extending from 104.1 to 105.2 megacycles is selected by the selecting circuit or filter 32 and applied to the receiving amplifier 33. The frequencies of 104.1 and 105.2 megacycles which appear in the output of the selecting circuit 32 are picked out by means of the circuits 44 and 45, respectively, and are then beaten together in the modulator 46. To produce a frequency of 1.1 megacycles, this frequency is selected by the selecting circuit 47, which may employ a piezoelectric crystal device. By means of the harmonic producer 48 there is now obtained a frequency of 100.1 megacycles which is selected by the circuit 49 and after being amplified in the amplifier 50 is used as a carrier supply for the demodulator 34. As before, the intermediate frequency band, which is assumed to extend from 4 to 5 megacycles, is selected by the filter 36 and applied to the multiplex receiving apparatus.

There are, of course, other possible methods of obtaining accurate carrier frequencies. It seems not unlikely that sources of standard frequency having a high degree of accuracy may eventually be transmitted over the country. Such sources could obviously be used for the radio system.

Consideration may now be given to the radio repeaters. As already noted, the object would be to secure a direct line of transmission between repeaters without intervening obstacles. This is because transmission at the ultra-short waves closely follows the laws of optics, so that efficient transmission is obtained only between two stations which are practically in sight of one another. There is, however, some bending of the waves, particularly around small obstacles.

In order to carry the transmission around the curvature of the earth, repeaters should be spaced at relatively close intervals and the antennas should be located as high above the surface of the earth as practicable. The following table indicates for various elevations the distance to the horizon and the distance to an object of the same height on a line tangent to the earth's surface (assuming, of course, that the earth's surface is spherical):

| Elevation— feet | Distance to horizon—miles | Distance to object of same height—miles |
|---|---|---|
| 6 | 3 | 6 |
| 50 | 8 | 17 |
| 100 | 12 | 25 |
| 200 | 17 | 35 |
| 500 | 27 | 55 |
| 1000 | 39 | 77 |
| 2000 | 55 | 110 |
| 4000 | 77 | 154 |
| 6000 | 89 | 178 |
| 10000 | 120 | 250 |

It appears from this table that if antennas are located at a reasonable height above the earth and if advantage is taken of natural variations in the elevation of the terrain, the span between repeaters might be of the order of 20 to 50 miles.

The relations indicated roughly in the table may be more precisely expressed by means of a formula. If $H_1$ and $H_2$ represent, respectively, the height of the two antennas expressed in feet, then the distance D in miles between the two antennas along a line tangent to the earth's surface (assuming this surface to be spherical) is given approximately by the equation:

$$D = 1.22 \times (\sqrt{H_1} + \sqrt{H_2}) \quad (1)$$

If the two antennas have the same height H, this expression reduces to:

$$D = 2.45\sqrt{H} \quad (2)$$

It will be convenient to consider, first, the problem of providing the amplification required for one direction of transmission. As already noted, there are two possibilities, namely, (1) to retransmit from each repeater on the same frequency which is received or (2) to retransmit at a frequency different from the incoming frequency. Repeaters employing the former method of transmission are disclosed in U. S. Patents Nos. 1,668,637 and 1,668,638 to L. Espenschied and D. K. Martin. When using this method it is necessary, in order to prevent singing, that there be some discrimination between the transmitting and receiving antenna circuits, the amount of discrimination required depending, of course, upon the amplification provided.

Figures 6, 7, 8:
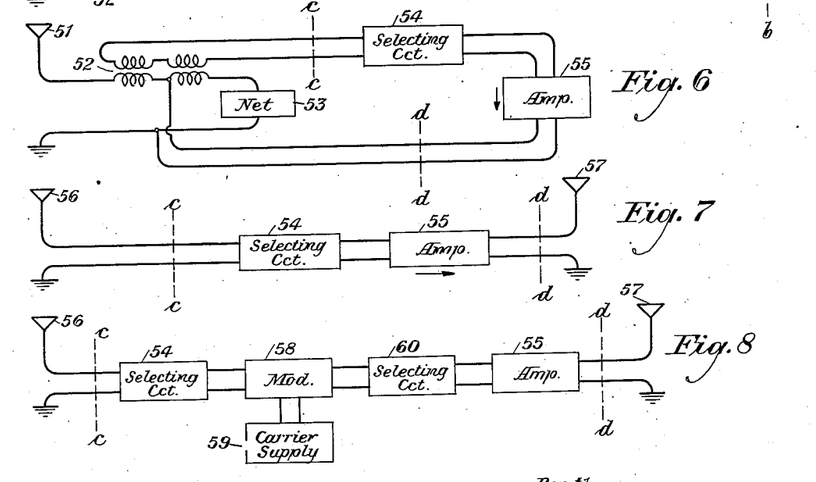
Figs. 6, 7, 8, 9, 10, 11 and 12 show various repeater arrangements for an ultra-short-wave radio system.

A certain amount of discrimination between transmitting and receiving circuits may be obtained by using the same antenna for both receiving and transmitting and providing balance between the incoming and outgoing transmission as illustrated in Fig. 6. In this case the frequencies received on the antenna 51, after passing through the double winding transformer 52, with which is associated a network 53 whose impedance balances the impedance of the antenna, are transmitted through the selecting circuit 54 which serves to eliminate any undesired frequencies which may be present. The wanted frequencies are amplified in the amplifier 55, and applied to the antenna in a manner conjugate to that in which the received signals were taken off. The antenna 51 should evidently be designed to have a two-directional characteristic so that it will receive from one direction and transmit in a generally opposite direction.

If it is desired to provide a degree of amplification such that the balance which may be obtained with Fig. 6 is insufficient, the arrangement of Fig. 7 might be employed. Here two antennas are employed, these antennas being preferably somewhat separated in space and each having a unidirectional characteristic. The signals picked up by the receiving antenna 56 are passed through the selecting circuit 54 and the amplifier 55 and applied to the transmitting antenna 57.

The amount of discrimination required between the incoming and outgoing circuits may be greatly reduced by using different frequencies for transmitting and receiving. In this case the possibility of singing or feedback conditions occurring through coupling between the receiving and transmitting circuits would be prevented by selecting circuits, possibly supplemented by a certain amount of antenna balance or separation. A simple arrangement using different incoming and outgoing frequencies is illustrated in Fig. 8. The signal band received by the antenna 56, after passing through the selecting circuit 54, is applied to the modulator 58, which is furnished with a carrier supply by a suitable source 59.

The modulation process serves to shift the received signals to the desired position for transmitting. The desired frequencies are selected by the selecting circuit 60 which serves to exclude undesired frequencies appearing in the modulator output. The signals are then amplified in the amplifier 55 and applied to the transmitting antenna 57. Obviously a similar arrangement may be used with only a single antenna. To do this the part of Fig. 8 between lines c—c and d—d may be used to replace the part of Fig. 6 lying between similarly marked lines.

When frequency shift is employed at the repeaters, the matter of frequency assignments becomes important. The total number of assignments required will evidently depend upon how soon it is feasible to use again a frequency which has been employed in a preceding repeater section. Frequently it will be possible to employ the same carrier frequency in alternate repeater sections.

Figure 9:
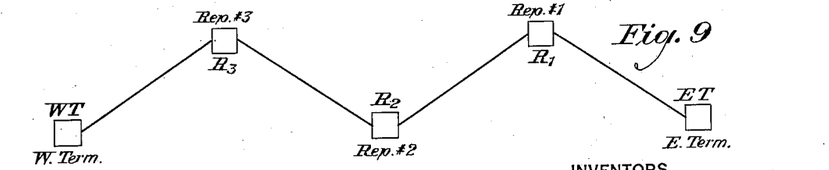

The problem of reusing frequencies previously employed might be simplified by locating repeaters along a staggered or irregular line, as shown in Fig. 9, which indicates a system comprising two terminals marked ET and WT, and repeaters $R_1$, $R_2$ and $R_3$. This arrangement is intended to illustrate in schematic form the essentials of a complete system for two-way transmission. It will be seen that the arrangement is such that, by employing directive transmission, the power transmitted from a given antenna is effective for only one receiving antenna.

Figure 10:
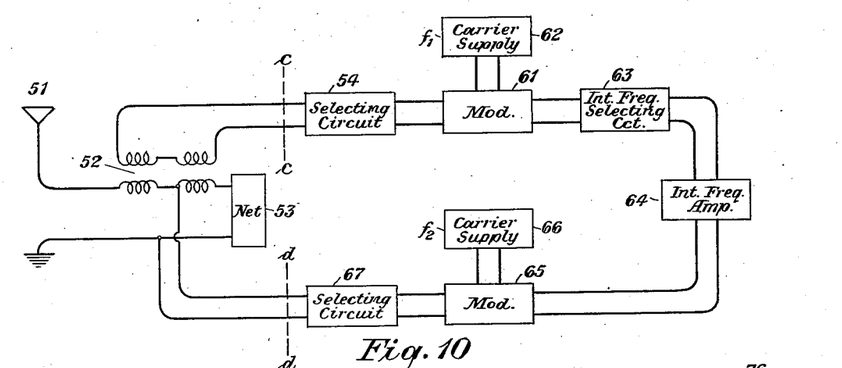

In Figs. 6, 7 and 8 it has been assumed that amplification might be provided at frequencies employed for radio transmission. In case difficulty is experienced in providing amplification at such high frequencies, the signal band may be brought down to an intermediate frequency where the amplification may be more readily provided, and then shifted upward to the desired radio frequency. This, of course, requires an additional step of modulation. An arrangement of this kind employing a single antenna with different frequencies for transmitting and receiving is illustrated in Fig. 10. As before, a two-winding transformer 52 and network 53 are associated with the antenna 51. The received signals, after passing through the transformer 52, are selected by the selecting circuit 54, which serves to exclude other frequencies received by the antenna. The output of the selecting circuit is then applied to the modulator 61, which is furnished with a carrier supply by the source 62. The signal band is brought down by the modulator to an intermediate frequency position where it is selected by the selecting circuit 63 and amplified in the amplifier 64. The amplifier output is then applied to the modulator 65, which derives its carrier from the source 66. This modulator raises the signal band to the frequency to be used for radio transmission. The band is selected by the selecting circuit 67 and applied to the antenna circuit through the hybrid coil arrangement as previously described. A similar arrangement may, of course, be provided with separate antennas for receiving and transmitting instead of the single antenna as shown. For this purpose the part of Fig. 10 lying between the lines c—c and d—d may be used to replace the part of Fig. 7 lying between similarly marked lines.

Figure 11:
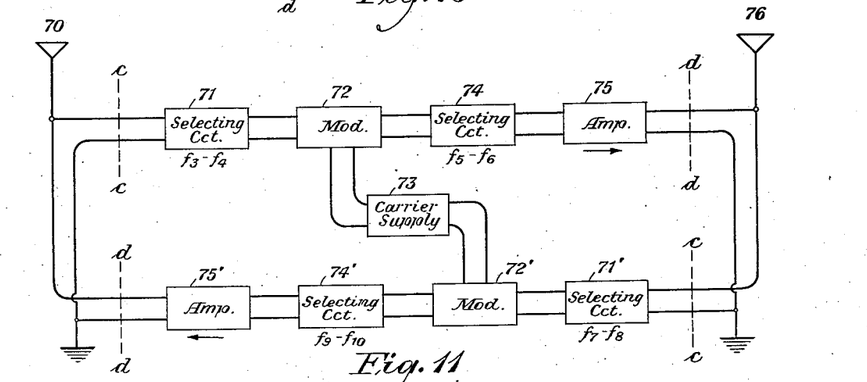

Thus far the discussion has been confined to a single direction of transmission. For the opposite direction of transmission a duplicate arrangement employing different radio frequencies might evidently be employed. Some economy in the use of antennas might be obtained, however, if the same antennas were used for both directions of transmission. An arrangement of this sort is shown in Fig. 11. For purposes of illustration it has been assumed that separate antennas would be used for transmitting and receiving and that the received signal band would be retransmitted in a different frequency position. Thus, the arrangement for the two directions of transmission is analogous to that shown in Fig. 8 for a single direction of transmission. The operation of this arrangement is as follows: The incoming signal band is received by the antenna 70 and by means of the selecting circuit 71 is separated from other frequencies which may be picked up by the antenna. The signal band is then applied to the modulator 72 which derives its carrier from the source 73. This modulator shifts the signal band to the position desired for transmission. The selecting circuit 74 serves to separate the desired band from the other components appearing in the output of the modulator 72, whereupon the signal band is amplified in the amplifier 75 and transmitted by the antenna 76.

The antenna 76 serves also to receive the signals proceeding in the opposite direction. These signals pass in succession through the selecting circuit 71', the modulator 72', the selecting circuit 74', and the amplifier 75', the function of each of these being similar to that of the corresponding unit for the opposite direction of transmission. The output of the amplifier 75' is then radiated by the antenna 70. It will be noted that the same carrier source is applied to the two modulators 72 and 72', the idea being to provide the same amount of frequency shift for the two directions of transmission, thus requiring only one source of carrier frequency.

While the repeater arrangement of Fig. 11 has been based upon the transmission scheme illustrated in Fig. 8, a similar scheme might be employed in connection with the arrangements shown in some of the other figures. For example, a two-way repeater without frequency shift would be obtained by using circuit arrangements similar to the part of Fig. 7 shown between lines c—c and d—d to replace correspondingly marked parts of Fig. 11. Again by substituting circuits conforming to the part of Fig. 10 lying between lines c—c and d—d for corresponding parts of Fig. 11, an intermediate frequency amplifying arrangement would be obtained. Moreover, a single antenna might be used instead of the two antennas of Fig. 11. For this purpose a part of Fig. 6 lying to the left of lines c—c and d—d would replace the corresponding part of Fig. 11.

Figure 12:
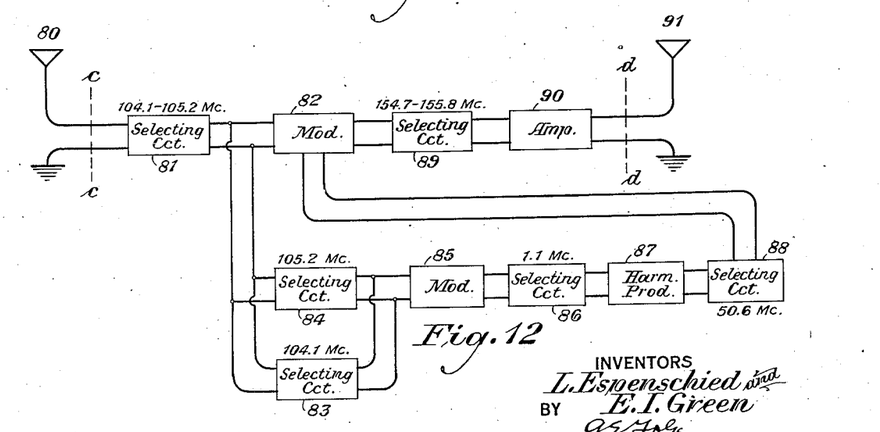

In view of the importance of accurate frequency allocations at the terminals of a multiplex system, it is, of course, desirable to have stable sources of frequency at repeaters which employ a shift of frequency. Such stability might be secured by deriving from the high-frequency wave itself the frequency source or sources required at the repeater. An arrangement for this purpose is illustrated in Fig. 12. It is assumed in this figure that frequencies of 104.1 and 105.2 megacycles are transmitted as a part of the short-wave band in accordance with the scheme illustrated in Fig. 5. The incoming band received by the antenna 80 is selected by the selecting circuit 81 and applied to the modulator 82. The received frequencies of 104.1 and 105.2 are selected by the selecting circuits 83 and 84, respectively, and applied to a modulator 85, from whose output a frequency of 1.1 megacycle is selected by the circuit 86. A harmonic producer 87 derives from the input frequency of 1.1 megacycle a harmonic frequency of 50.6 megacycles which is selected by the selecting circuit 88 and used as the carrier supply for the modulator 82. The desired band appearing in the output of the modulator 82 is selected by the selecting circuit 89, this band having been shifted by the frequency of 50.6 megacycles from the received position. The output band is then amplified in the amplifier 90 and radiated by the antenna 91. A similar sort of scheme is obviously applicable to the production of any of the carrier frequencies desired at a repeater point for the different arrangements which have been illustrated.

Figure 13:
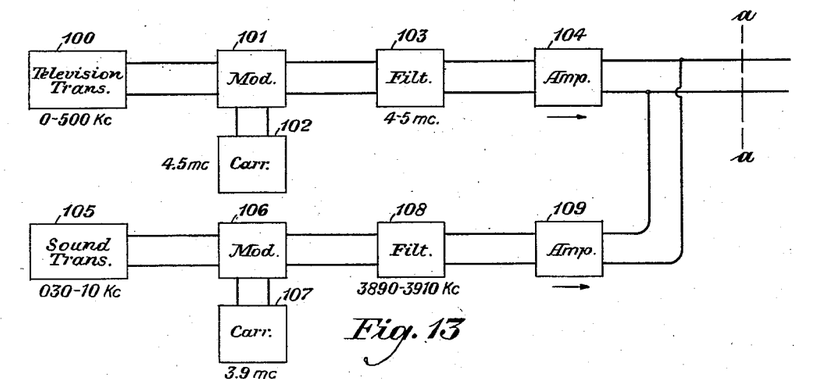
Figs. 13 and 13a illustrate an arrangement whereby a combined sound and television system may be employed in conjunction with the systems described.
Figure 13A:
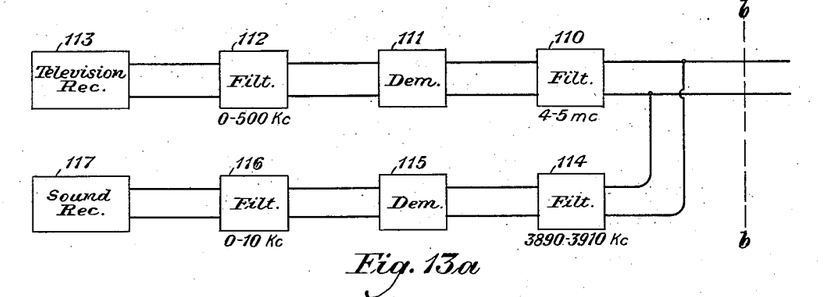

The various elements of the complete multi-repeatered ultra-short wave system having now been covered, and a multiplexing arrangement having been presented whereby the system may be used for providing telephone channels, the use of the system for television transmission may next be considered. Fig. 13 and Fig. 13a illustrate in more detail an arrangement of television apparatus which may be employed as indicated schematically in Fig. 1. The television transmitting apparatus 100 may be of any well known type, as, for example, that disclosed in a copending application of Frank Gray, Serial No. 227,649, filed October 21, 1927. This apparatus may include a suitable mechanism for scanning the image, photoelectric cells for converting the resulting light variations into electric signals, and means for amplifying these signals. The width of the signal band obtained in the output of the television transmitter will depend upon the degree of image definition provided. In the present instance it will be assumed that this band extends from 0 to 500 kilocycles.

This television signal band is applied to a modulator 101 which is supplied by a source 102 with a carrier frequency assumed to be 4.5 megacycles. In the output of this modulator the upper and lower sidebands of modulation, namely, 4.5–5 megacycles and 4–4.5 megacycles, together with the carrier frequency are selected by the filter 103, which substantially suppresses other unwanted modulation products. The output of this filter is amplified in the amplifier 104.

The sound signals accompanying the television signals are picked up and amplified in the sound transmitting apparatus 105. If it is desired to deliver a program of good quality, these signals may extend from about 30 cycles to 10,000 cycles. For ordinary conversational purposes, however, a band of about 2,500 cycles in width will suffice. The sound signals are applied to a modulator 106 which is provided by the source 107 with a carrier supply assumed to be 3.9 megacycles. The two sidebands of modulation, which, in the case of program transmission, may extend from 3,890 to 3,910 kilocycles, and the carrier frequency are selected by the filter 108, which excludes undesired frequencies. After passing through the amplifier 109, the sound signals are combined with the television signals for application to the radio system.

On the receiving side the radio system delivers a complete intermediate frequency band representing both the sound and television signals. As shown in Fig. 13a, the television signals are selected by the filter 110 and applied to the demodulator 111, which yields, among other products, the original television band extending from 0 to 500 kilocycles. This band is selected by the filter 112 and applied to the television receiver 113 which serves to reproduce the original image.

The sound signals received from the radio system are selected by the filter 114 and restored to their original frequency position by the demodulator 115. After passing through the filter 116 which eliminates undesired modulation products, they may be amplified and reproduced in the sound receiving apparatus 117.

In the above description it has been assumed that double sideband transmission would be employed both for the television signals and for the sound signals. It would be quite possible, however, to employ single sideband transmission. For this purpose one of the methods of obtaining a single sideband disclosed in a copending application of E. I. Green, Serial No. 608,113, filed April 28, 1932, might be employed.

The television system might be a two-way system in which the television serves as an adjunct to a telephone conversation or it might be a one-way system in which the television and sound program is used for broadcasting or other purposes. In the latter case the oppositely directed part of the system might be omitted if desired.

Another type of system which may be used for the transmission of a wide band of frequencies is the coaxial type of system as disclosed in U. S. Patent No. 1,835,031, issued December 8, 1931, to L. Espenschied and H. A. Affel. The coaxial system has characteristics which are somewhat similar to those of the ultra-short-wave system, and it is therefore possible to combine the two types of systems with advantageous results in many cases. According to the particular circumstances involved, either system might act as a feeder or supplement to the other.

Figure 14:
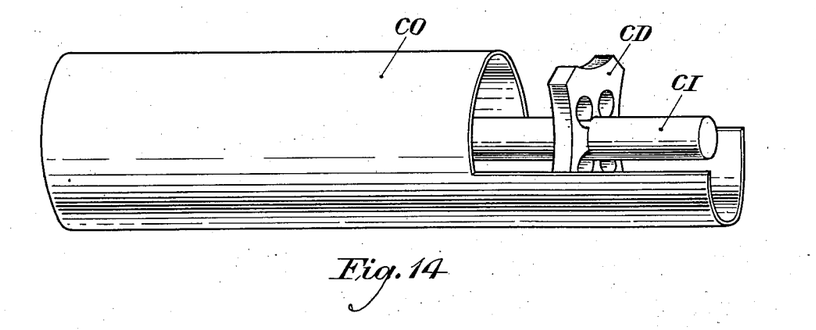
Fig. 14 shows a type of coaxial circuit which may be used for a wide-band transmission system.

A type of coaxial circuit which may be used for a wide-band transmission system is illustrated in Fig. 14. This circuit consists of an inner conductor CI supported concentrically with respect to an outer conductor CO, the two conductors being separated by insulating discs or beads CD. Obviously, many other forms of coaxial construction might be employed instead of that shown in Fig. 14. For example, either the inner or outer conducting path of the coaxial circuit might be formed, not of a single conductor, but of a cylindrical assembly of conducting wires, strips, tapes, ribbons or the like. Such forms of construction would be particularly advantageous where a flexible structure is desired. For the insulation between the two conductors, other shapes of spaced members might be used or a continuous spirally applied string or strip of dielectric material might be used. Generally, it will be desirable that the amount of insulating material employed be a minimum in order that the dielectric between the two conductors may be largely gaseous. In some instances, however, it may be found advantageous to use a dielectric which is partly or wholly non-gaseous as, for example, rubber insulation.

The coaxial circuit is peculiarly adapted to the transmission of high frequencies or a wide range of frequencies without excessive attenuation and without the possibility of interference from external sources. These properties are due primarily to the phenomenon of skin effect in the conductors, in accordance with which the transmitted currents tend to flow on the inner surface of the outer conductor and the outer surface of the inner conductor. Hence, the conducting material is used more effectively than is the case with ordinary construction in which a pair of wires forms a transmission circuit. Since the interfering currents tend to flow on the outer surface of the outer conductor of the coaxial circuit, this conductor acts as a highly effective shield against induction from external sources. In contrast to an ordinary unshielded circuit, in which balance is relied upon to reduce the external induction and for which as a result the susceptibility to external influences increases as the frequency is increased, the coaxial circuit possesses a shield whose effectiveness increases with increasing frequency. Consequently, when circumstances make it desirable, the energy transmitted over the coaxial circuit may be attenuated to a minimum level which is limited only by the noise occasioned by thermal agitation of electricity in the conductors themselves. The spacing between amplifiers in a coaxial system may, therefore, be determined by this minimum level and the amplifier output level which is feasible.

In combining radio and coaxial systems certain modifications are required in the multiplexing procedure as previously described. In the design of amplifiers for coaxial conductor systems it has been found desirable to limit the ratio of the maximum and minimum frequencies used for line transmission to something like 10.1. Hence if the coaxial conductor system were designed to transmit a band of 1000 kilocycles (as was assumed for the radio system in Fig. 2) the upper frequency on the coaxial circuit might be about 1100 kilocycles and the lower frequency about 100 kilocycles. The upper frequency would preferably be kept as low as possible in order to limit the requirements for the line circuit and repeaters. Consequently, the frequency band on the coaxial system would, in general, occupy a range lower than the intermediate frequency range which would be passed to and from the radio system. In order to bridge the gap between the two, a single step of modulation might be used on the transmitting side and a corresponding step of modulation on the receiving side.

Figure 15:
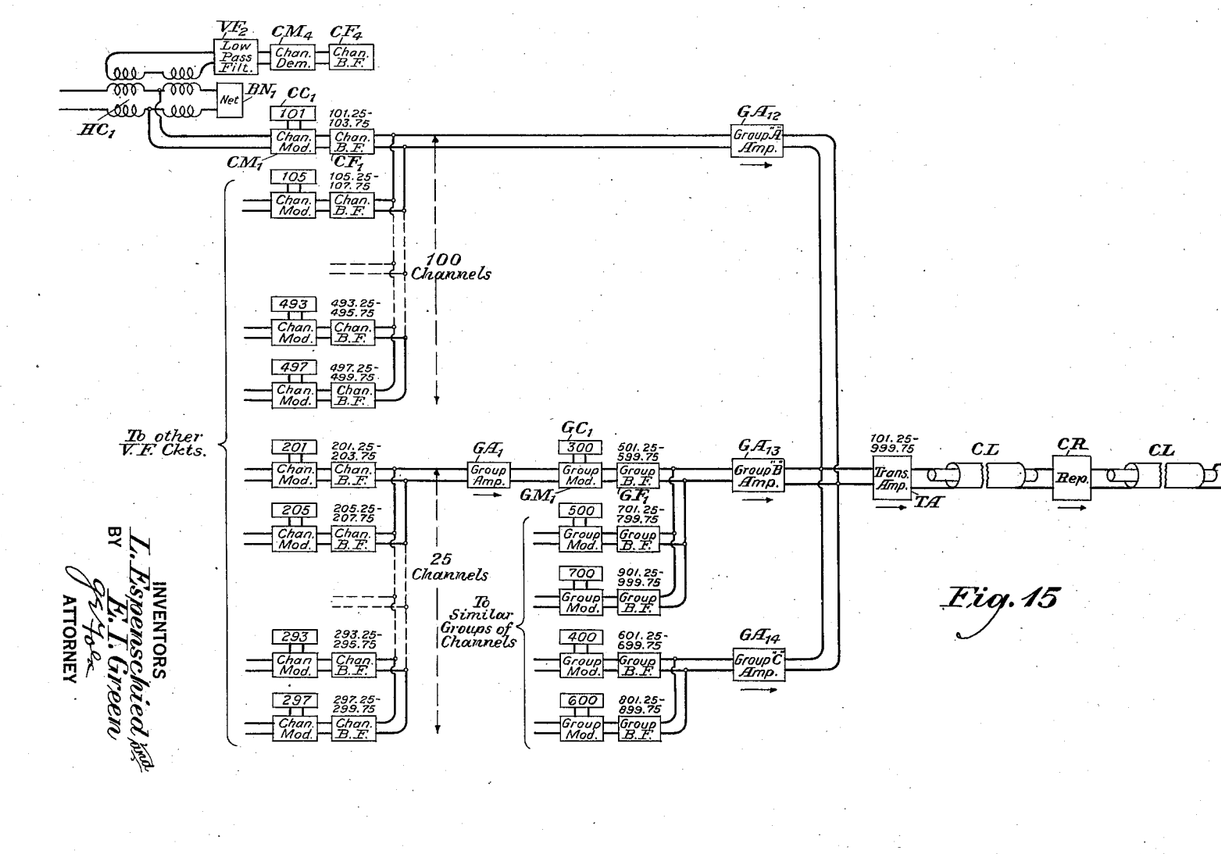
Figs. 15, 15a and 15b are a diagram of a combination of coaxial and ultra-short-wave systems.
Figure 15A:
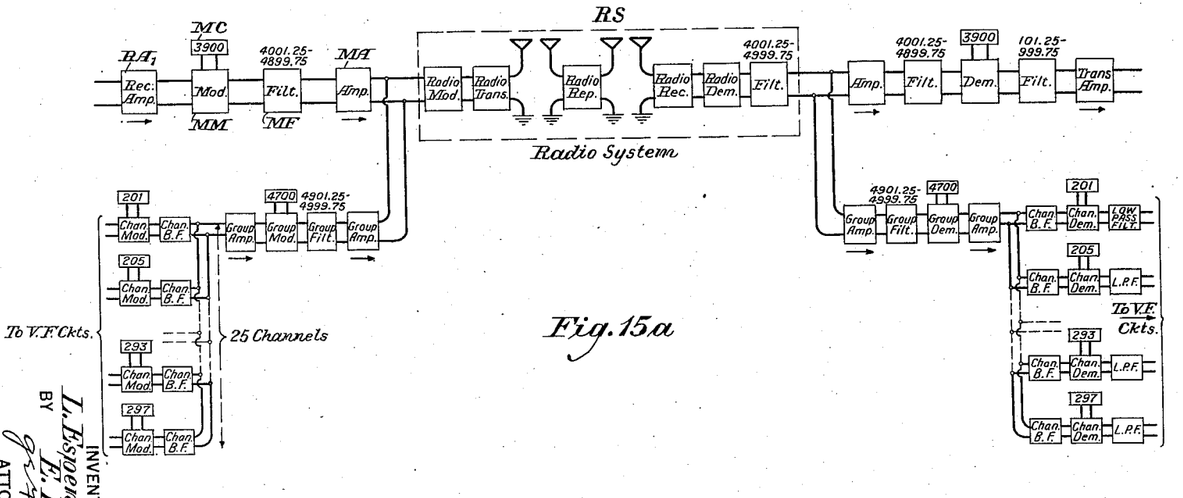
Figure 15B:
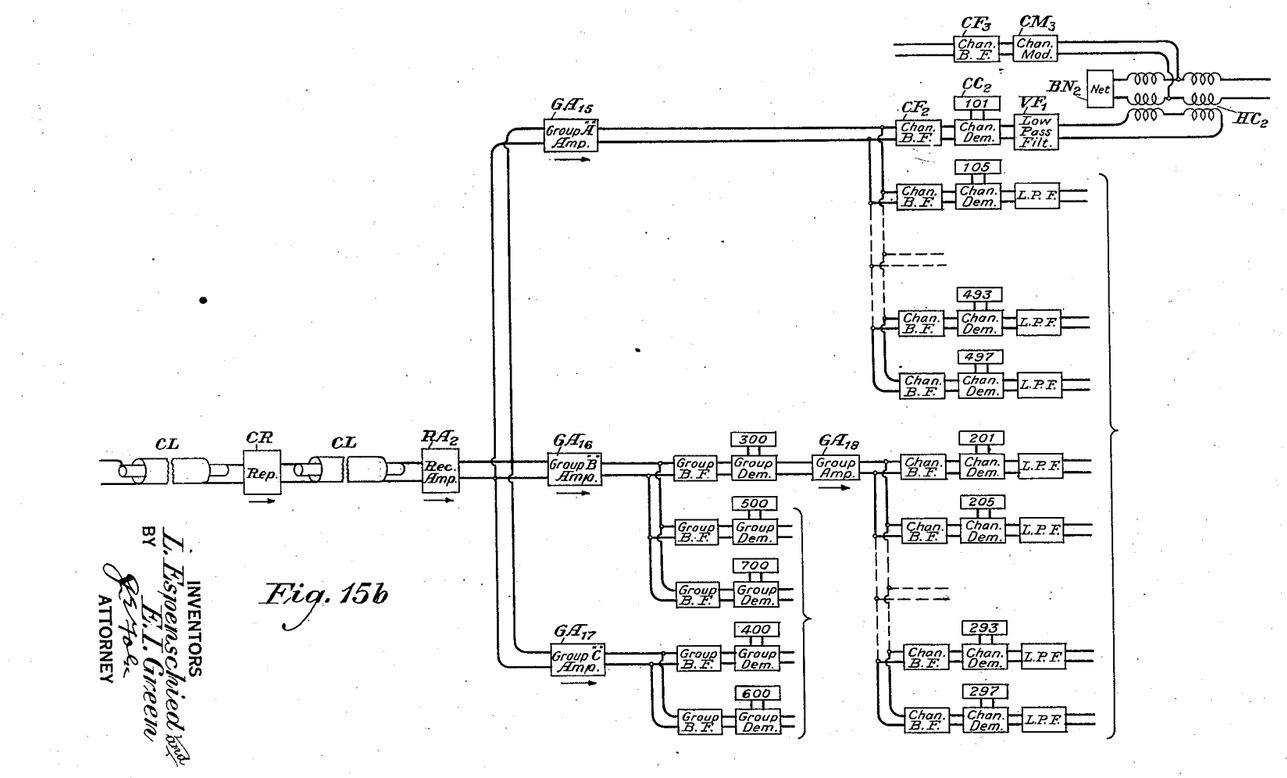

An arrangement for a combined coaxial and radio system is shown in Figs. 15, 15a and 15b which taken together illustrate the system. The frequency band covered by the coaxial system is assumed to extend from 100 to 1000 kilocycles, yielding a total of 225 channels. The drawing shows also a method whereby additional channels may be fed in directly at the transmitting end of the radio system and drawn off at the receiving end, a range of 100 kilocycles being assumed to provide 25 such channels. Similar arrangements might be provided for adding or dropping off circuits at intermediate points in the coaxial system without bringing all channels down to voice frequencies.

The principles involved in Figs. 15, 15a and 15b are generally similar to those which were described in connection with Fig. 2 and Fig. 2a, so that a brief description will suffice in the present instance. The individual channel modulating and selecting arrangements and the group modulating and amplifying arrangements are similar to those of Fig. 2 and Fig. 2a. In the present instance, however, the frequencies desired for line transmission are such that some of the channels require only a single step of modulation. These channels, passing through the group amplifier $GA_{12}$, are combined with the channels of other groups as delivered by the group amplifiers $GA_{13}$ and $GA_{14}$, the whole embracing a frequency range extending from approximately 100 to 1000 kilocycles. This frequency band, after amplification in the transmitting amplifier TA, is transmitted over the coaxial line CL and may be amplified in one or more repeaters CR before arriving at the radio terminal. At this point the received band, after passing through the receiving amplifier $RA_1$, is shifted in position by the modulator MM whose carrier supply is furnished by the source MC. The filter MF selects in the output a frequency band extending from approximately 4000 to 4900 kilocycles, which, after passing through the amplifier MA, is ready for application to the radio system proper.

The arrangement shows also how additional voice-frequency channels may be fed in at the beginning of the radio system. For this purpose individual channel modulating and selecting apparatus and group modulating, selecting and amplifying apparatus is provided as indicated, and the output band, which is assumed to extend from approximately 4900 to 5000 kilocycles, representing a total of 25 channels, is combined with the band received over the coaxial system. The elements of the radio system RS have already been described.

On the receiving side the apparatus functions in a generally reverse manner from that on the transmitting side. As indicated, a group of channels may be dropped off at the radio terminal, while other groups are passed on over a coaxial line, with repeaters where necessary, to a final receiving terminal where the channels are restored to their voice-frequency position. While in Fig. 15a the same group of channels which is fed in is dropped off, other groups of channels could likewise be dropped off by the use of suitable frequencies.

Figure 16:
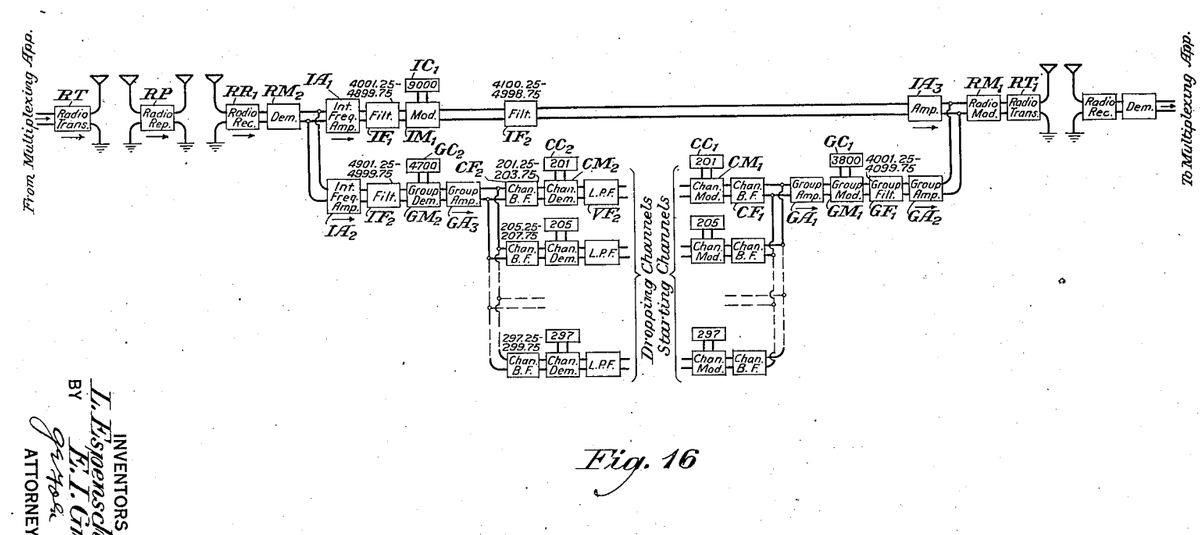
Fig. 16 shows a method of adding and dropping circuits in such a system.

In case it is desired to drop off circuits at intermediate points in the radio system, the arrangement of Fig. 16 may be employed. The general scheme of modulation and selection is similar to those which have previously been described. At the intermediate point in the radio system all of the channels are brought down to an intermediate frequency range. Channels to be dropped off are reduced to voice frequencies, while those which are not to be dropped are shifted slightly in position, combined with starting channels and raised again to the frequencies for radio transmission. Because of the difficulty in obtaining sharp filter cut-offs in the intermediate frequency range (which is necessarily high), the channels to be dropped are taken off at the top of the intermediate frequency band and the new channels are put in at the bottom. Hence, there is no overlapping of the new channels by partially suppressed frequencies of the old ones.

Referring to Fig. 16, it will be seen that many of the elements of the system are similar to those of previous figures and have been similarly marked. At the intermediate point in the system, the radio-frequency band, after passing through the radio receiver $RR_1$, is reduced to an intermediate frequency range by the demodulator $RM_2$. The intermediate frequency band is then applied to the two parallel amplifiers $IA_1$ and $IA_2$. The output of one of these channels to be passed through is selected by the filter $IF_1$ and applied to the modulator $IM_1$ which inverts the entire band and shifts its position by approximately 100 kilocycles. The carrier supply for the modulator is furnished by the source $IC_1$. The desired frequency band in the modulator output is selected by the filter $IF'_2$, and after passing through the amplifier $IA_3$, is ready for combination with the starting channels.

In the output of the other amplifier $IA_2$ the channels to be dropped off are selected by the filter $IF_2$ and passed through the group demodulator $GM_2$, the group amplifier $GA_3$ channel filters such as $CF_2$, channel demodulators such as $CM_2$, and low-pass filters such as $VF_2$, the processes being the same as for corresponding elements of Fig. 2.

Similarly, the starting channels pass through channel modulating and selecting equipment such as $CM_1$ and $CF_1$, and group amplifying, modulating and selecting equipment such as $GA_1$, $GM_1$, $GC_1$ and $GF_1$. The group of starting channels is then passed through the group amplifier $GA_2$ and combined with the channels delivered by the amplifier $IA_1$, the combination being applied to the radio modulator $RM_1$ and the radio transmitter $RT_1$.

While the invention has been disclosed for purposes of illustration in certain specific forms, it will be obvious that its basic principles as defined in the appended claims are such as to permit its incorporation in many widely different organizations.

What is claimed is:

1. In a radio system capable of transmitting a band of frequencies whose width is many times the width of the audible frequency range, terminal arrangements whereby said frequency band may be utilized for a plurality of signaling channels, terminal apparatus for transmitting radio signals, a plurality of repeaters for receiving and transmitting radio signals, terminal apparatus for receiving radio signals, and arrangements in at least one of said repeaters for dropping off signaling channels and adding other signaling channels.

2. In a radio system which is designed for the transmission of a frequency band comprising a plurality of signaling channels, the method of dropping off and adding channels at a repeater point which consists in receiving a radio frequency band, producing from said band an intermediate frequency band, dividing said intermediate frequency band into two parts, reducing the channels comprising one of said parts to a voice-frequency position and dropping off said channels, introducing voice-frequency signal bands of other channels, producing from said voice-frequency bands an intermediate frequency band, combining with the second of said intermediate frequency parts the intermediate frequency band representing the added channels, raising said combined band to a radio frequency position, and transmitting the resultant radio frequency band.

3. In a radio system capable of transmitting a band of frequencies whose width is many times the width of the audible frequency range, said radio system including terminal apparatus for transmitting radio signals, a plurality of repeaters for receiving and transmitting radio signals, terminal apparatus for receiving radio signals, at least one of said repeaters including means for dividing the received frequency band into two parts, means for utilizing one of said parts, means for combining with the other of said parts another frequency band, and means for transmitting the combined band.

4. In a system capable of transmitting a band of signal frequencies whose width is many times the width of the audible frequency range, said system including terminal arrangements whereby said signal band may be utilized for a plurality of signaling channels, a radio system having a plurality of intermediate repeaters, a coaxial system employing a line circuit comprising two conductors arranged in coaxial relation to one another, repeaters at intermediate points in said line circuit, means for dropping off and adding circuits at at least one repeater point in said radio system, and means for dropping off and adding channels at the junctions of said radio system and said coaxial system.

5. A radio system whereby there may be transmitted a band of signal frequencies whose width is many times the width of the audible frequency range, such radio system including terminal arrangements for utilizing said signal band for a plurality of signaling channels, means for deriving from a common frequency source the carrier frequencies required at one terminal of the system, means for producing control frequencies lying one above and one below the signal bands transmitted over the radio system so that said control frequencies will be separated by a frequency width many times that between adjacent channels, means to transmit said control frequencies along with the signal band, and means at some point in the system for deriving from said control frequencies a frequency many times as great as the inter-channel separation, whereby the frequency for shifting the entire signal band in the frequency spectrum may be derived by simple harmonic production.

6. A radio system whereby there may be transmitted a band of signal frequencies whose width is many times the width of the audible frequency range, said radio system including terminal arrangements for utilizing said signal band for a plurality of signaling channels, terminal apparatus for receiving and transmitting said signal band, repeater apparatus for receiving, amplifying and transmitting said signal band, means at one of said terminals for deriving from a common frequency source the carrier frequencies required at said terminal, means for deriving from said source control frequencies lying one above and one below the signal band transmitted over the radio system so that said control frequencies will be separated by a frequency width many times that between adjacent channels, means to transmit said control frequencies over the radio system along with the signal band, and means at repeater points for deriving from said control frequencies a frequency many times as great as the inter-channel separation, whereby the frequency for shifting the entire signal band in the frequency spectrum may be derived by a simple harmonic production.

7. In a multiplex transmission system, means for deriving control frequencies lying one above and one below the band of frequencies to be transmitted by the system so that said control frequencies will be separated by a frequency width many times that between adjacent channels, means for transmitting said control frequencies over the system in association with said band of signal frequencies, and means at some point in the system for deriving from said control frequencies a frequency many times as great as the inter-channel separation, whereby the frequency for shifting the entire signal band in the frequency spectrum may be derived by simple harmonic production.

8. A radio system whereby there may be transmitted a band of signal frequencies whose width is many times the width of the audible frequency range, said radio system including terminal arrangements for utilizing said signal band for a plurality of signaling channels, means for deriving from a common frequency source the carrier frequencies required at one terminal of the system, means for transmitting over the system a frequency difference derived from said frequency source and not greater than the separation between channels, means at the other terminal for deriving the required carrier frequencies from said frequency difference, means for producing control frequencies lying one above and one below the signal band transmitted over the radio system so that said control frequencies will be separated by a frequency width many times that between adjacent channels, means to transmit said control frequencies along with the signal band, and means at some point in the system for deriving from said control frequencies a frequency many times as great as the inter-channel separation, whereby the frequency for shifting the entire signal band in the frequency spectrum may be derived by simple harmonic production.

9. In a transmission system capable of transmitting a band wide enough to accommodate a plurality of signal channels, the method of dropping and adding signal channels at points in the system which consists in selecting from one side of the band the portion of the band to be dropped, shifting the remaining portion of the band so that at least a part thereof occupies the space previously occupied by the selected portion, leaving a corresponding space on the other side of said remaining portion for the addition of channels.

10. In a transmission system capable of transmitting a band wide enough to accommodate a plurality of signal channels, the method of dropping and adding signal channels at points in the system which consists in selecting from one side of the band the portion of the band to be dropped, shifting the remaining portions of the band so that at least a part thereof occupies a space previously occupied by the selected portion, and adding channels to occupy the space at the other side of said remaining portion.

11. In a transmission system capable of transmitting a band wide enough to accommodate a plurality of signal channels, the method of dropping and adding signal channels at points in the system which consists in selecting from the upper side of the band the portion of the band to be dropped, shifting the remaining portion of the band upward in the frequency spectrum so that substantially the space previously occupied by the selected portion will be again occupied, and adding channels in the space at the lower side of said remaining portion.

LLOYD ESPENSCHIED.
ESTILL I. GREEN.